US011895029B2

United States Patent
Alleyne et al.

(10) Patent No.: US 11,895,029 B2
(45) Date of Patent: Feb. 6, 2024

(54) NETWORK PROCESSOR WITH EXTERNAL MEMORY PROTECTION

(71) Applicant: NOKIA SOLUTIONS AND NETWORKS OY, Espoo (FI)

(72) Inventors: Brian Alleyne, Los Gatos, CA (US);
Matias Cavuoti, San Jose, CA (US);
Li-Chuan Egan, Los Altos, CA (US);
Mimi Dannhardt, Vienna, VA (US);
Krishnan Subramani, San Jose, CA (US); Mohamed Abdul Malick Mohamed Usman, Fremont, CA (US);
Roxanna Ganji, Fremont, CA (US);
Stephen Russell, Linden, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 110 days.

(21) Appl. No.: 17/548,451

(22) Filed: Dec. 10, 2021

(65) Prior Publication Data

US 2023/0188467 A1    Jun. 15, 2023

(51) Int. Cl.
*H04L 47/00* (2022.01)
*H04L 47/122* (2022.01)
*H04L 47/10* (2022.01)
*H04L 47/52* (2022.01)
*H04L 47/32* (2022.01)

(52) U.S. Cl.
CPC ............ *H04L 47/122* (2013.01); *H04L 47/29* (2013.01); *H04L 47/326* (2013.01); *H04L 47/521* (2013.01)

(58) Field of Classification Search
CPC ....... H04L 47/29; H04L 47/30; H04L 47/122; H04L 47/521; H04L 47/326

USPC .......................................................... 370/235
See application file for complete search history.

(56) References Cited

U.S. PATENT DOCUMENTS

| 6,487,212 | B1 * | 11/2002 | Erimli ................. H04L 49/9078 711/E12.077 |
| 6,690,645 | B1 * | 2/2004 | Aweya .................. H04L 47/263 370/412 |
| 6,934,256 | B1 | 8/2005 | Jacobson et al. |
| 7,286,485 | B1 * | 10/2007 | Ouellette ............... H04L 47/32 370/252 |
| 8,797,877 | B1 | 8/2014 | Perla et al. |
| 2003/0223447 | A1 * | 12/2003 | Saxena ............... H04L 49/9073 370/428 |

(Continued)

OTHER PUBLICATIONS

EP Search Report mailed in corresponding EP Application No. 22212104.8 dated Mar. 30, 2023, 8 pages.

*Primary Examiner* — Robert J Lopata
(74) *Attorney, Agent, or Firm* — Tong, Rea, Bentley & Kim, LLC (57) ABSTRACT

Systems and methods for protecting external memory resources to prevent bandwidth collapse in a network processor. One embodiment is a network processor including an input port configured to receive packets from a source device, on-chip memory configured to store packets in queues, and external memory configured to provide a backing store to the on-chip memory. The network processor also includes a processor configured, in response to determining that the source device is unresponsive to a congestion notification, to reduce a size of one or more queues to prevent packets transferring from the on-chip memory to the external memory.

21 Claims, 9 Drawing Sheets

(56) References Cited

U.S. PATENT DOCUMENTS

| | | | | |
|---|---|---|---|---|
| 2006/0045008 | A1* | 3/2006 | Sun | H04L 47/30 |
| | | | | 370/465 |
| 2016/0065484 | A1* | 3/2016 | Suzuki | H04L 47/623 |
| | | | | 370/415 |
| 2016/0248704 | A1* | 8/2016 | Soelberg | H04L 67/30 |
| 2016/0308769 | A1* | 10/2016 | VerSteeg | H04L 43/0852 |
| 2017/0083444 | A1* | 3/2017 | Dev | G06F 12/0871 |
| 2017/0272372 | A1* | 9/2017 | Gafni | H04L 47/32 |
| 2017/0351452 | A1* | 12/2017 | Boyd | G06F 3/0611 |
| 2020/0287833 | A1* | 9/2020 | Bottorff | H04L 47/11 |
| 2020/0356484 | A1* | 11/2020 | Subbarao | G11C 11/413 |
| 2020/0409855 | A1* | 12/2020 | Subbarao | G06F 12/0811 |
| 2021/0297354 | A1* | 9/2021 | Zemach | H04L 47/722 |
| 2021/0328930 | A1* | 10/2021 | Nikolaidis | H04L 47/127 |
| 2022/0137236 | A1* | 5/2022 | Conflitti | G01S 19/30 |
| | | | | 342/357.25 |
| 2022/0321489 | A1* | 10/2022 | St-Denis | H04L 49/9084 |
| 2023/0011790 | A1* | 1/2023 | Agarwal | G06F 12/0868 |
| 2023/0059755 | A1* | 2/2023 | Mukherjee | H04L 47/6215 |

\* cited by examiner

NETWORK PROCESSOR WITH EXTERNAL MEMORY PROTECTION

FIELD

The invention generally relates to network processors and, more particularly, to congestion control in network processors.

BACKGROUND

A network processor is a programmable integrated circuit that is optimized to process packet data. Routers, switches, and other network devices may rely on network processors to perform functions such as packet inspection, encryption, monitoring, traffic management, and queue management. A network processor includes a memory subsystem to temporarily buffer data while processing packets. Two types of memory may be used to buffer packets: a local on-chip memory that is relatively fast and expensive, and an external memory that is relatively slow and cheap as compared on a per bit metric.

Congestion occurs at the network processor when incoming traffic exceeds outgoing bandwidth of a given port. To handle congestion, a network processor performs Active Queue Management (AQM) which involves intelligent buffer management strategies, such as Random Early Discard (RED), that notify source devices to back off before queues overflow in packet buffer memory. AQM typically uses deep queues to perform its functions and therefore network processors often rely on external memory to perform AQM.

Traditionally, external memory bandwidth has always been greater or equal to the line bandwidth so that the entire line bandwidth can participate in buffer access for performing AQM. However, in recent years, external memory bandwidth has been outpaced by line bandwidth, and some network processors are provided with less external memory bandwidth to reduce costs. Unfortunately, in current implementations, rogue source devices or microbursts in traffic can overload the external memory, causing bandwidth collapse in which line throughput becomes limited to the external memory bandwidth and all additional traffic is dropped.

SUMMARY

Systems and methods presented herein provide mechanisms for protecting external memory resources to prevent bandwidth collapse in a network processor. First, bandwidth utilization of external memory is monitored and used as an indicator for congestion. If external memory utilization begins to show signs of becoming full, congestion notifications are sent to request source devices to slow traffic, potentially limiting further increases of external memory utilization. Alternatively or additionally, if source devices are unresponsive to congestion notifications and/or external memory usage is becoming full, a bad queue is automatically reduced to protect the external memory.

One embodiment is a network processor that includes an input port configured to receive packets from a source device, on-chip memory configured to store packets in queues, and external memory configured to provide a backing store to the on-chip memory. The network processor also includes a processor configured, in response to determining that the source device is unresponsive to a congestion notification, to reduce a size of one or more queues to prevent packets transferring from the on-chip memory to the external memory.

In a further embodiment, the processor is configured to send the congestion notification to the source device by applying a bandwidth utilization of the external memory as an input parameter to a Random Early Discard (RED) profile. In yet a further embodiment, the processor is configured to determine that that the source device is unresponsive to the congestion notification based on an increase in the bandwidth utilization of the external memory after sending the congestion notification. In another further embodiment, the processor is configured to initiate sending congestion notification to the source device based on a first threshold of the bandwidth utilization being exceeded, and to initiate selecting queues to reduce in size based on a second threshold of the bandwidth utilization being exceeded that is higher than the first threshold.

In another further embodiment, the processor configured to reduce the size of the one or more queues in response to applying a Random Early Discard (RED) profile to preemptively select queues based on bandwidth utilization of the external memory. In yet another further embodiment, the processor is configured to reduce the size of the one or more queues in response to detecting that the one or more queues have hit a maximum depth. In still a further embodiment, the congestion notification includes one of an explicit congestion notification and packet drop via Random Early Discard (RED).

Another embodiment is a method. The method includes receiving packets from a source device, storing, in on-chip memory, packets in queues, and providing external memory as a backing store to the on-chip memory. The method also includes in response to determining that the source device is unresponsive to a congestion notification, reducing a size of one or more queues to prevent packets transferring from the on-chip memory to the external memory.

Yet another embodiment is a non-transitory computer readable medium embodying programmed instructions which, when executed by a processor, are operable for performing a method of reducing traffic congestion in a network processor in communication with external memory providing a backing store to queues storing packets in on-chip memory, the method comprising: in response to determining that the source device is unresponsive to a congestion notification, reducing a size of one or more queues to prevent packets transferring from the on-chip memory to the external memory.

The various embodiments disclosed herein may be implemented in a variety of ways as a matter of design choice. For example, the embodiments may take the form of computer hardware, software, firmware, or combinations thereof. Other example embodiments are described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
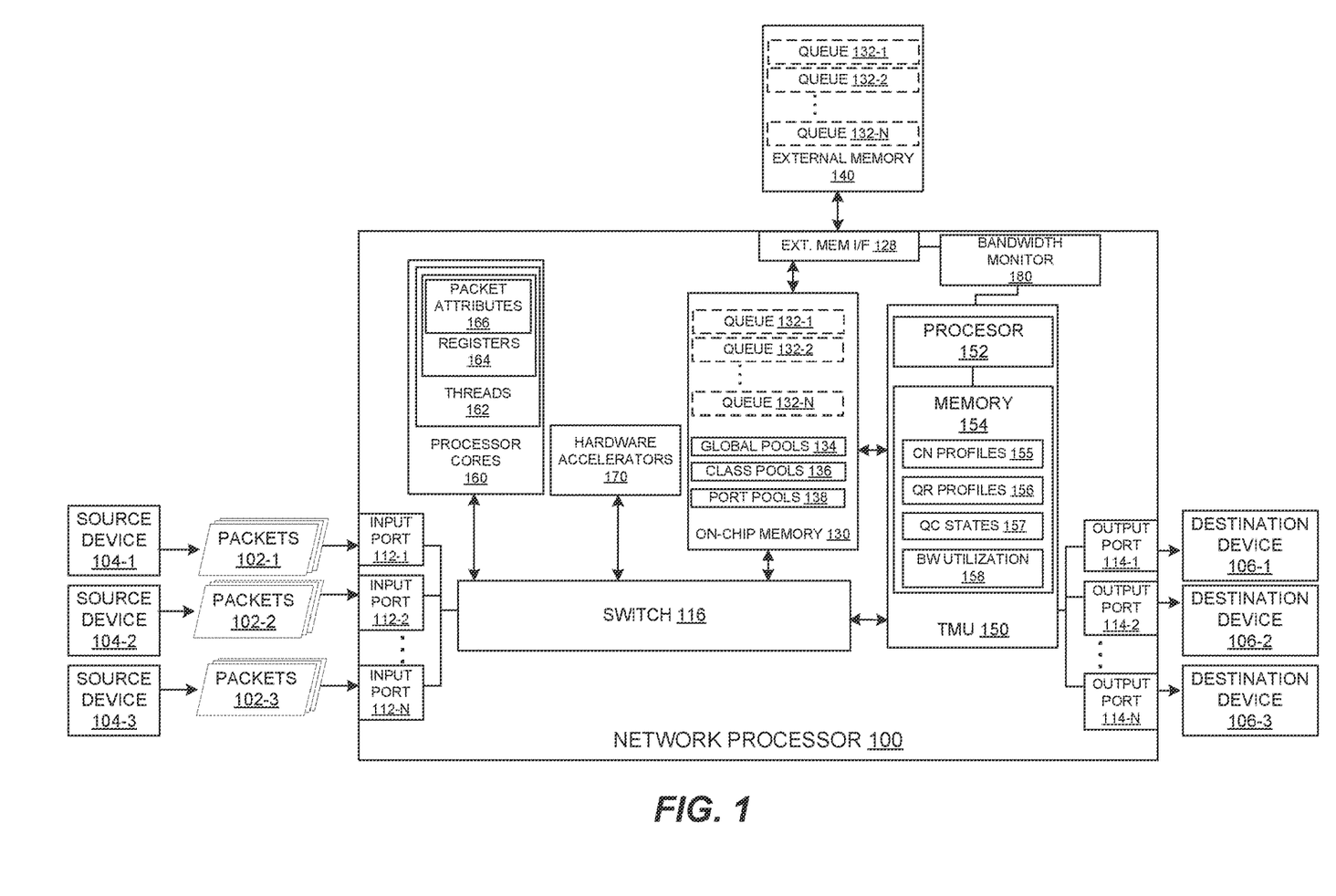
FIG. 1 is a block diagram of a network processor in an illustrative embodiment.

FIG. 1 is a block diagram of a network processor 100 in an illustrative embodiment. Generally, the network processor 100 receives packets 102 from one or more source devices 104, performs processing operations on the packets 102, and transmits the packets 102 out to one or more destination devices 106. The network processor 100 includes one or more input ports 112, one or more output ports 114, and a switch 116. The switch 116 comprises a high-bandwidth interconnect between internal components of the network processor 100 including a traffic manager unit (TMU) 150, one or more processor cores 160, and one or more hardware accelerators 170.

The TMU 150 is configured to perform scheduling and buffering functions for outgoing packets while meeting Quality of Service (QoS) demands. In doing so, packet data is managed in queues 132 using a combination of on-chip memory 130 and external memory 140. The on-chip memory 130, sometimes referred to as cache memory, may be implemented as embedded static random-access memory (SRAM) internal to the network processor 100. That is, on-chip memory 130 may form a portion of a system-on-a-chip (SoC) and be incorporated, along with and other components of the network processor 100, on a single integrated circuit chip. By contrast, the external memory 140, sometimes referred to as off-chip memory, may be implemented as dynamic random-access memory (DRAM) that is separate to the SoC of the network processor 100. Accordingly, the network processor 100 may include or communicatively couple with two types of memory to buffer packets: a local on-chip memory that is relatively fast and expensive, and an off-chip memory that is relatively slow and cheap as compared on a per bit metric.

If an incoming packet cannot immediately be forwarded on an output line it may be stored in a queue 132 in on-chip memory 130. If enough time elapses before a packet is serviced, the packet may be pushed or re-mapped to external memory 140 to help clear the on-chip memory 130 through cache eviction techniques. Therefore, packets 102 and queues 132 may reside in on-chip memory 130, external memory 140, or some combination of both (as indicated by the dashed lines of queues 132 in FIG. 1) depending on the length of time packets are forced to wait before being sent to an output port 114. The on-chip memory 130 and external memory 140 may be communicatively coupled via an external memory interface 128 of the network processor 100.

In a conventional network processor, congestion occurs if traffic exceeds the capacity of a port or exceeds the configured rates in the traffic manager associated with a port. Typical effects of congestion include packet loss, queueing delay, blocking of new connections, and lower quality of service. Traditional congestion avoidance techniques include random early discard (RED, also known as random early detection or drop) and explicit congestion notification (ECN).

In conventional RED, packets are dropped based on statistical probabilities according to queue length. If a given queue (or set of queues) is empty or low, all incoming packets are accepted. As the queue grows, the probability of dropping an incoming packet grows accordingly, reaching 100% when the queue is full. ECN is an extension of the Transmission Control Protocol (TCP) and signals impending congestion in the IP header of transmitted packets. The receiver of an ECN-marked packet echoes the congestion indication to the sender, which reduces its transmission rate as though it had detected a dropped packet.

Although RED or ECN may be used to request a source device to reduce its packet rate based on queue depth, in some circumstances such as a denial-of-service (DoS) attack, a source device becomes rogue and does not respond to explicit congestion notifications or packets being dropped. Unfortunately, since a typical queue may be sized to store hundreds or thousands of packets, it can take a long time for the congestion to cause a queue to hit its maximum queue depth, at which point additional packets destined for that queue are dropped.

Additionally, if a sufficient number of the source devices 104 are unresponsive, their cumulative bandwidth may exceed the output bandwidth of a network processor. This can result in an undesired behavior called bandwidth collapse in which the line throughput of the network processor becomes limited to the bandwidth of the external memory. A network processor may include less external memory bandwidth for cost reasons, and therefore, under conditions in which congestion collapse occurs, the throughput of the network processor drastically slows.

The network processor 100 is therefore enhanced to address the above-described issues by performing one or more bandwidth collapse prevention measures. In particular, the network processor 100 is enhanced to perform a bandwidth utilization mechanism of the external memory 140, or a queue size reduction mechanism for bad queues, or both. The bandwidth utilization mechanism tracks the bandwidth use of the external memory 140 and uses the bandwidth to trigger congestion indicators. The network processor 100 is thus enhanced with a bandwidth monitor 180 coupled with the external memory interface 128 to measure usage of the external memory 140. Advantageously, by treating bandwidth utilization of external memory 140 like a queue, the network processor 100 is configured to notify source devices 104 to back off before external memory 140 is full or overused at 100% of its capacity to prevent bandwidth collapse conditions.

The queue size reduction mechanism decreases the maximum depth of a bad queue to begin dropping packets early and avoid the waste of routing packets of the queue to the external memory 140. That is, the network processor 100 is enhanced to detect among the queues 132 one or more bad queues associated with a source device 104 which is not responding to congestion notifications. The bad queue is then automatically resized or cut in length to a small value (e.g., sufficient to hold just 2-3 packets, typically 1.5 kb to 9.2 kb per packet depending on programming). By decreasing the max queue depth, the bad queue is prevented from becoming large, and packets are dropped from the bad queue rather than being routed to external memory 140. The external memory 140 is thus advantageously protected from being consumed by misbehaving traffic.

The network processor 100 includes one or more processor cores 160 to perform parallel processing for packets 102. Each processor core 160 may include a set of threads 162, or executable units, connected to link-layer interfaces and the packet buffer, as well as dedicated registers 164 providing layer one (L1) caches. As each packet arrives, an assigned thread 162 reads the header into a register 164 to be stored for processing while the remainder of the packet is temporarily stored in on-chip memory 130. The header fields are processed to determine various packet attributes 166 for each packet such as destination address, source address, IP protocol, source port, and destination port. The packet attributes 166 are used to classify each packet to a forwarding class and priority, and to link each packet to a queue 132.

The buffer space of on-chip memory 130 may be shared or partitioned according to multiple traffic pools including one or more global pools 134, class pools 136, and/or port pools 138. A global pool 134 is memory space that the ports of the network processor 100 may dynamically share as buffering space is needed. A class pool 136 allocates buffer space to a particular type of traffic or traffic priority. For example, a forwarding class of a packet may include a lossless, best-effort, or network control class. Alternatively or additionally, a packet may be designated as having high, medium, or low priority. A port pool 138 may allocate memory space for particular ports and/or queues 132 (e.g., to dedicate more buffer space to queues 132 that transport lossless traffic). A portion of the memory may also include dedicated buffers to ensure ports and queues 132 receive a minimum memory allocation.

For each packet, the packet attributes 166 are processed to associate the packet with a queue 132 which may belong to a global pool 134, class pool 136, and/or port pool 138. Additionally, to support bandwidth collapse prevention measures bandwidth described herein, the packet attributes 166 may also associate the packet with a congestion notification profile 155 and/or a queue resizing profile 156. Each congestion notification profile 155 correlates an amount of bandwidth utilization of external memory 140 with a probability of generating congestion notifications (e.g., using an ECN slope or RED slope). Each queue resizing profile 156 correlates an amount of bandwidth utilization of external memory 140 with a probability of performing queue resizing.

As packets are enqueued and dequeued the TMU 150 may track a status of queue congestion states 157 for determining the appropriate traffic to drop to preserve the external memory 140. Additionally, the TMU 150 may track a status of bandwidth utilization 158 of external memory 140 obtained from the bandwidth monitor 180. As described in greater detail below, the bandwidth utilization 158 may be applied to a congestion notification profile 155 and/or queue resizing profile 156 to implement the bandwidth collapse prevention measures described herein. The congestion notification profiles 155, queue resizing profiles 156, queue congestion states 157, and bandwidth utilization 158 may be stored in memory 154 of the TMU 150.

The network processor 100 may be embodied as any type of networking device capable of performing the functions described herein including a network router (e.g., layer three (L3) enabled device), or layer two (L2) network devices such as an intelligent switch, hub, or other network device. In some embodiments, the network processor 100 comprises many processing components working in parallel, some or all of which may be configured to perform different tasks or combinations of tasks. For example, Additionally, although one TMU 150 is shown in FIG. 1, the network processor 100 may include multiple TMUs 150 each associated with an output port 114.

The hardware accelerators 170 may offload certain networking-specific processing tasks in custom or programmable logic. Examples of the hardware accelerators 170 include a search engine, an Access Control List (ACL)/Ternary Content Addressable Memory (TCAM) engine, a packet header parser, a packer reordering block, encryption/decryption engines, packet data inspections, pattern matching, and the like. The processor cores 160 and hardware accelerators 170 may thus perform tasks such as parsing packets 102 received from the input ports 112, applying rules or policies to packets 102 (e.g., traffic flow control, traffic shaping, security, etc.), locating forwarding information for packets 102, discarding packets 102, and/or determining which output ports 114 to transmit packets 102.

In one embodiment, the TMU 150 performs functions with a processor 152 and memory 154. The processor 152 may be embodied as any type of processor capable of performing the functions described herein. For example, the processor 152 may be embodied as a single or multi-core processor(s), digital signal processor, microcontroller, or other processor or processing/controlling circuit. Similarly, the memory 154 may be embodied as any type of volatile or non-volatile memory or data storage capable of supporting the functions described herein. In operation, the memory 154 may store various data and programming used during operation of the network processor 100, such as operating systems, applications, programs, libraries, and drivers. The memory 154 may be communicatively coupled to the processor 152 via an I/O subsystem, which may be embodied as circuitry and/or components to guides, printed circuit board traces, etc. and/or other components and subsystems to facilitate the input/output operations.

Figure 2:
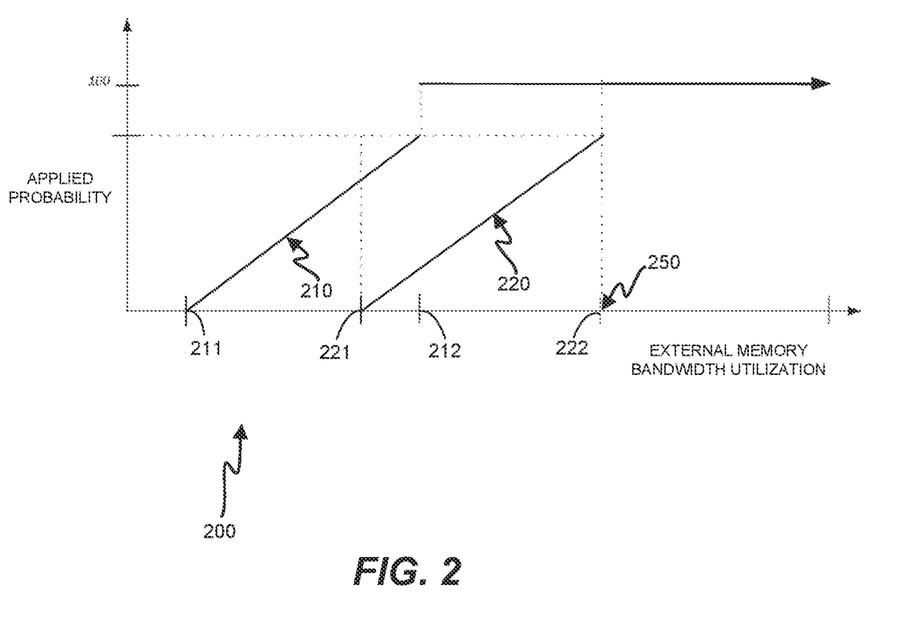
FIG. 2 illustrates a congestion notification profile in an illustrative embodiment.

FIG. 2 illustrates a congestion notification profile 200 in an illustrative embodiment. The congestion notification profile 200 determines a probability that a given packet is associated with a notification of congestion to a source device. More particularly, in contrast with conventional ECN and RED techniques that are based on queue length, the congestion notification profile 200 is based on external memory bandwidth utilization to prevent bandwidth collapse conditions. Thus, as bandwidth utilization of external memory increases, the probability of a packet being associated with a congestion notification also increases.

The congestion notification may be generated via marking the packet via an ECN mark slope 210 or dropping the packet via a drop slope 220. If a packet is marked with ECN based on the probability of the ECN mark slope 210, a congestion experienced bit is set prior to forwarding the packet to its receiver endpoint, and the receiver then sends a message to the source device that indicates there is congestion on the network. If the source device is properly responding it acknowledges the congestion notification message and reduces its transmission rate. Thus, packets marked via ECN request the source device to back-off. On the other hand, if a packet is dropped with RED based on the probability of the drop slope 220, the dropped packet signals to the network that congestion is occurring. For example, source devices on an IP network may respond to TCP packet drops by reducing the packet transmission rate to allow the congestion to clear.

FIG. 2 shows an example in which the congestion notification profile 200 implements both an ECN mark slope 210 and a drop slope 220. The ECN mark slope 210 is defined by an ECN start point 211 and ECN end point 212. Similarly, the drop slope 220 is defined by a start drop point 221 and an end drop point 222. Each slope 210/220 associates an amount of bandwidth utilization of external memory (e.g., a percentage of maximum bandwidth capacity) with a probability of sending a congestion notice to the associated source device.

As bandwidth usage of external memory crosses a first threshold (e.g., ECN start point 211), a non-zero probability of marking the packet via ECN is applied. The probability increases linearly with increasing usage of external memory until a second threshold (e.g., ECN end point 212) is crossed, at which point a defined maximum probability of marking is applied and all packets are marked. Similarly, as bandwidth usage of external memory crosses a third threshold (e.g., start drop point 221), a non-zero probability of dropping the packet via RED is applied. The probability increases linearly with increasing usage of external memory until a fourth threshold (e.g., end drop point 222) is crossed, at which point a defined maximum probability of dropping is applied and all packets are dropped. As shown in this example, the ECN mark slope 210 and drop slope 220 may be offset such that ECN is applied earlier (e.g., for lower bandwidth usage of external memory) as compared to drops.

The technique of increasing a packet's probability of triggering a congestion notification as congestion of external memory increases may be applied to overall usage of external memory 140. Alternatively or additionally, a congestion notification profile 200 may be applied based on the external memory usage of traffic pool(s) 134/136/138 and/or queue(s) 132. Accordingly, the TMU 150 may apply or manage a number of different congestion notification profiles 200 having different thresholds, slopes, and/or maximum probabilities according to different groups of queues 132, traffic classes/priorities, etc. In some embodiments, congestion notification profiles 200 execute simultaneously or in parallel on a packet-by-packet basis for overall external memory usage, per-pool external memory usage, and per-queue memory usage, etc.

In one embodiment, a congestion notification profile 200 may include or define a queue size reduction threshold 250 that triggers a queue size reduction mechanism. In the example shown in FIG. 2, the queue size reduction threshold 250 corresponds with the end drop point 222 at which point all packets begin to drop, though numerous threshold configurations are possible. It may be the case that the congestion notifications generated via the congestion notification profile 200 were not successfully adhered to by a source device, resulting in further increases of external memory bandwidth usage. The queue size reduction threshold 250 may thus initiate a second bandwidth collapse prevention measure to reduce the size of a bad queue to decrease external memory bandwidth usage.

Figure 3:
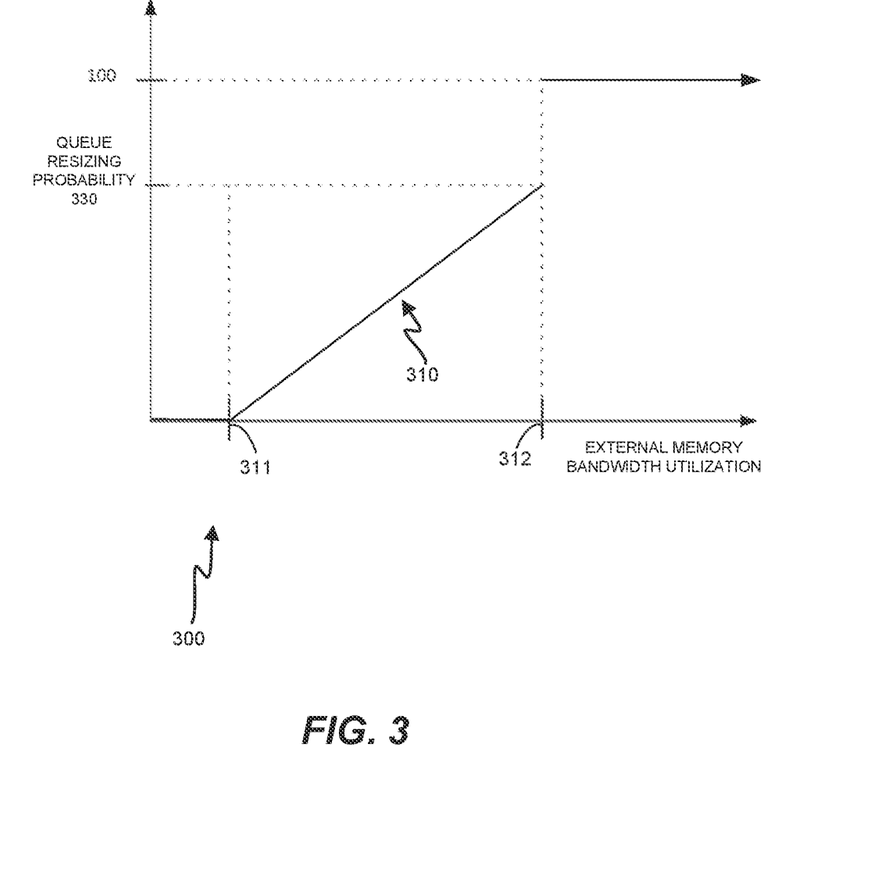
FIG. 3 illustrates a queue resizing profile in an illustrative embodiment.

FIG. 3 illustrates a queue resizing profile 300 in an illustrative embodiment. The queue resizing profile 300 determines a probability of selecting a queue to resize based on external memory bandwidth utilization. That is, as external memory bandwidth utilization increases, the probability of selecting a queue 132 to resize also increases. Similar to the congestion notification profile 200 described above, the queue resizing profile 300 includes a queue resizing slope 310 defined by a start resizing point 311 and an end resizing point 312. As external memory bandwidth utilization crosses the start resizing point 311, a non-zero probability of selecting a queue for resizing is applied. The probability increases linearly with increasing usage of external memory until the end resizing point 312 is crossed, at which point a defined maximum probability 330 of selecting is applied and all queues are resized. By increasing the probability of selecting queues to resize, bad queues are prevented from becoming large, thus protecting external memory 140 from misbehaving traffic.

The TMU 150 may apply or manage a number of different queue resizing profiles 300 having different thresholds, slopes, and/or maximum probabilities according to different groups of queues 132, traffic classes/priorities, etc. The queue resizing profiles 300 may thus execute simultaneously or in parallel on a packet-by-packet basis for overall external memory usage, per-pool external memory usage, and per-queue memory usage, etc. If a queue resizing profile 300 indicates to select a queue to resize, the queue selection may be based on external memory bandwidth utilization, traffic class/priority associated with the queue, queue occupancy levels, or some combination thereof. In one embodiment, the TMU 150 determines or selects bad queues based on a ranking that uses a combination of queue congestion states 157 and bandwidth utilization 158 (e.g., as applied per-pool and/or per-queue). Accordingly, queues associated with relatively lower traffic priorities, higher congestion states, and higher external memory usage are selected before queues associated with relatively higher traffic priorities, lower congestion states, and lower external memory usage.

Advantageously, the network processor 100 may select a queue to be artificially reduced in size so that its associated, less desirable traffic, is dropped instead of growing the queue with the potential of being evicted to external memory 140. Moreover, traffic of higher priority that is less likely to use the external memory 140 is not impacted. The reduced queue may return to its normal size (e.g., a size sufficient for performing active queue management), if the packets begin to be serviced from the limited size queue to indicate the congestion is cleared.

Figure 4:
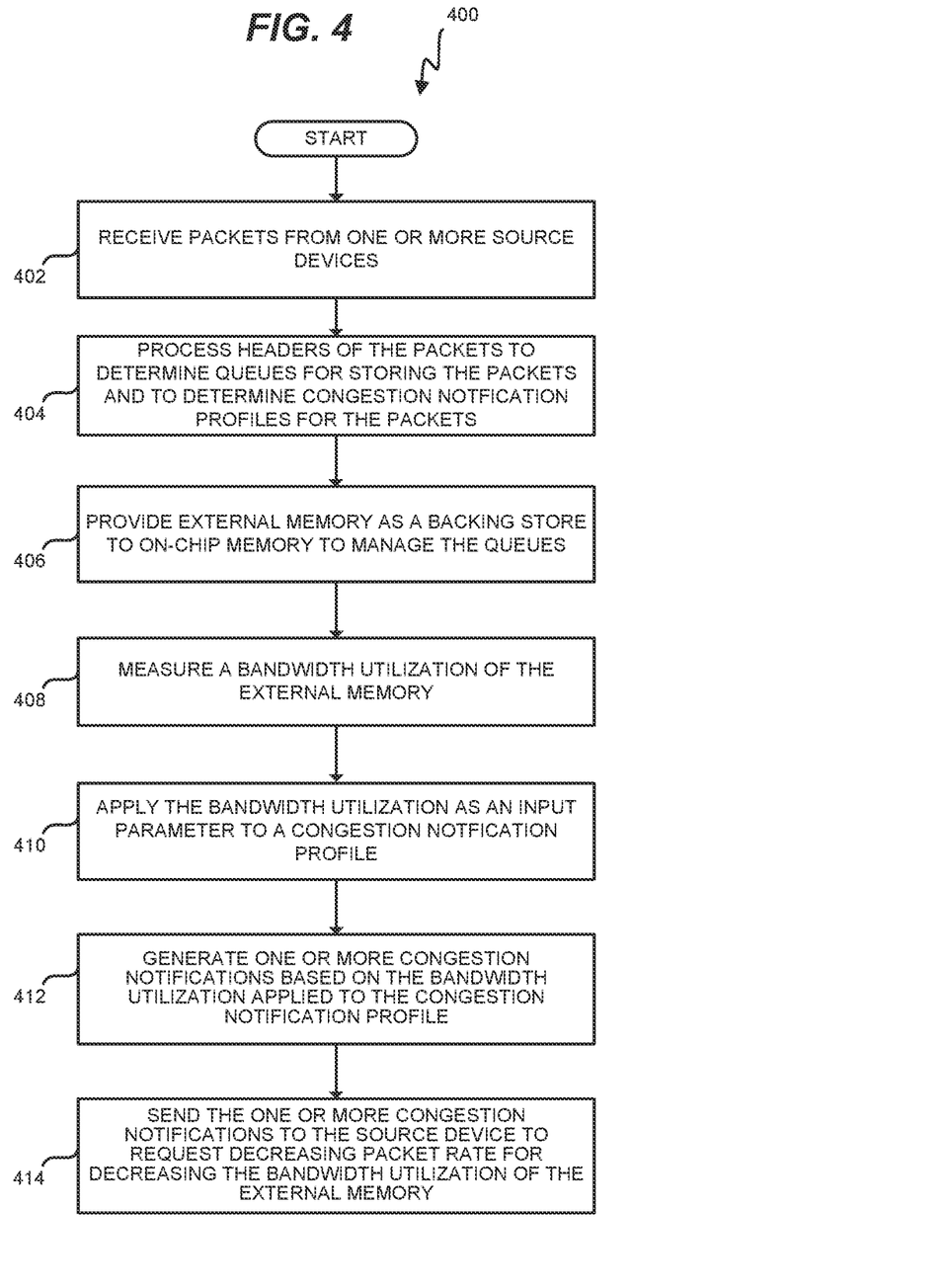
FIG. 4 is a flowchart illustrating a method of reducing traffic congestion in a network processor in an illustrative embodiment.

FIG. 4 is a flowchart illustrating a method 400 of reducing traffic congestion in a network processor in an illustrative embodiment. In particular, the method 400 relates to an external memory bandwidth utilization technique for reducing congestion. The steps of method 400 are described with reference to the network processor 100 of FIG. 1, but those skilled in the art will appreciate that the method 400 may be performed in other systems. The steps of the flowcharts described herein are not all inclusive and may include other steps not shown. The steps described herein may also be optionally performed or performed in an alternative order.

In step 402, the input ports 112 of the network processor 100 receive packets 102 from one or more source devices 104. In step 404, one or more processor cores 160 process headers of the packets 102 to determine queues 132 for storing the packets 102, and to determine one or more congestion notification profiles 155 for the packets 102. For example, a thread 162 and/or TMU 150 may determine or assign settings of a congestion notification profile 155 (e.g., end/start threshold, maximum probability, etc.) to a packet based on its packet attributes 166 and corresponding priority, queue, pool, etc.

In step 406, external memory 140 (e.g., off-chip DRAM memory) is provided as a backing store to the on-chip memory 130 (e.g., on-chip SRAM memory) to manage the queues 132. That is, the external memory 140 is configured to act as a backing store to store packets transferred from the on-chip memory 130 that stores packet data and other data structures waited in the on-chip memory 130 for a period of time.

In step 408, the bandwidth monitor 180 measures a bandwidth utilization of the external memory 140. In step 410, a processor of the network processor 100 applies the bandwidth utilization as an input parameter to a congestion notification profile 155. For example, a drop slope may be determined in step 404 and relate to the allowed bandwidth utilization of a queue 132 or a group of queues 132 with respect to the external memory 140. In one embodiment, the TMU 150 includes logic or a RED engine for executing congestion notification profiles 155. In another embodiment, a thread 162 can read the state or output of a congestion notification profile 155 after the current bandwidth utilization 158 is applied as input.

In step 412, the processor generates one or more congestion notifications based on the bandwidth utilization applied to the congestion notification profile. In one embodiment, packet congestion is indicated based on an ECN mark slope. Alternatively or additionally, packet congestion is indicated based on a RED slope. In step 414, the network processor 100 sends the one or more congestion notifications to the source device 104 to request decreasing packet rate for decreasing the bandwidth utilization of the external memory 140. Thus, in the method 400, the network processor 100 is enhanced to apply the utilization of the external memory 140 to generate notifications which may preserve the external memory 140. By contrast, previous implementations track the size of a queue as an input to an ECN or RED profile.

Figure 5:
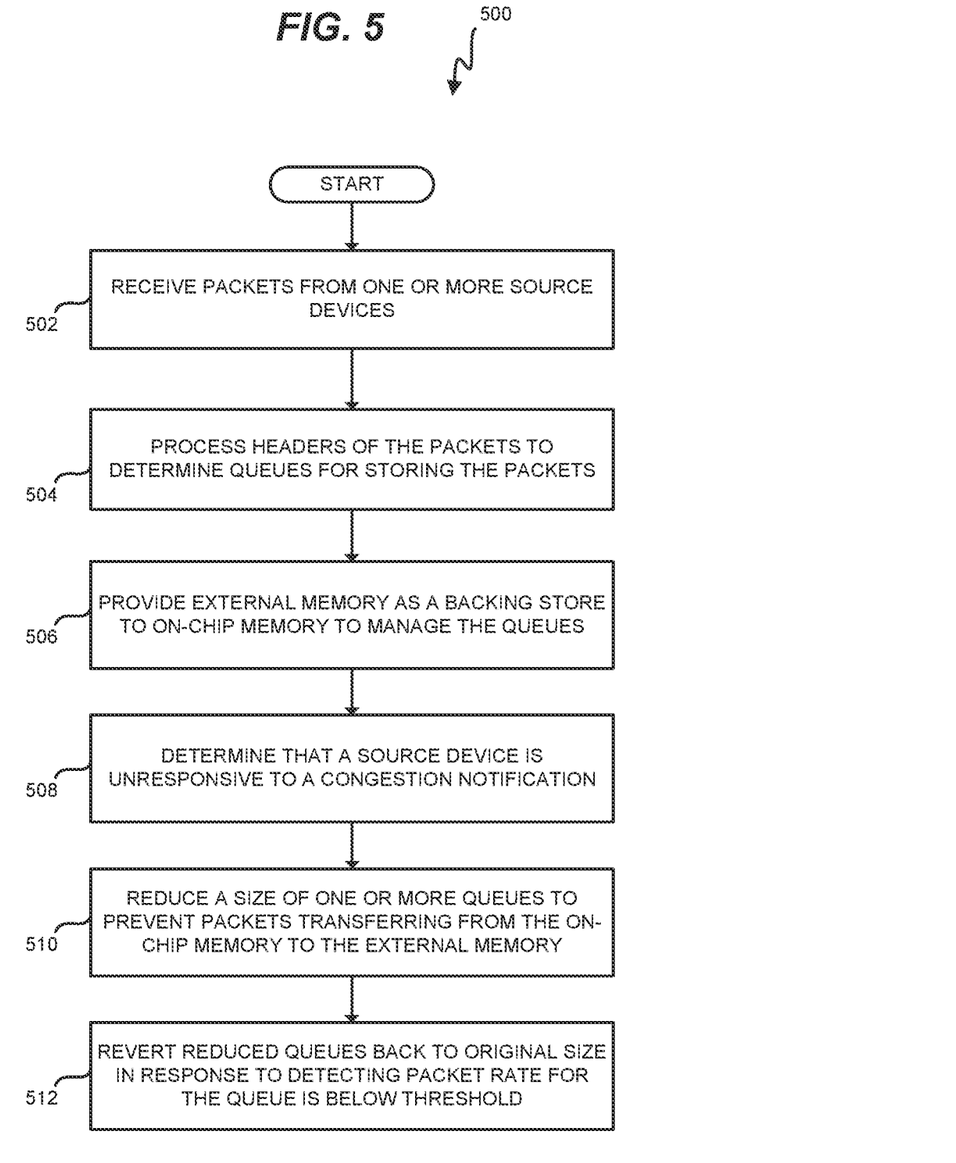
FIG. 5 is a flowchart illustrating a method of reducing traffic congestion in a network processor in an illustrative embodiment.

FIG. 5 is a flowchart illustrating a method 500 of reducing traffic congestion in a network processor in an illustrative embodiment. In particular, the method 500 relates to a bad queue reconfiguration technique for reducing congestion. The steps of method 500 are described with reference to the network processor 100 of FIG. 1, but those skilled in the art will appreciate that the method 300 may be performed in other systems.

In step 502, the input ports 112 of the network processor 100 receive packets 102 from one or more source devices 104. In step 504, one or more processor cores 160 process headers of the packets 102 to determine queues 132 for storing the packets 102. In some embodiments, the headers are also processed to determine one or more queue resizing profiles 156 for the packets 102. For example, a thread 162 and/or TMU 150 may determine or assign settings of a queue resizing profiles 156 (e.g., end/start threshold, maximum probability, etc.) to a packet based on its packet attributes 166 and corresponding priority, queue, pool, etc.

In step 506, external memory 140 (e.g., DRAM memory) is provided as a backing store to the on-chip memory 130 (e.g., on-chip SRAM memory) to manage the queues 132. In step 508, a processor (e.g., thread 162 or TMU 150) determines that a source device 104 is unresponsive to a congestion notification. For example, the processor may determine that the source device 104 is unresponsive to packets discarded via the applied RED profile (e.g., explicit drops) or marked via ECN based on a queue size reduction threshold 250 being exceeded in a congestion notification profile 155. Alternatively or additionally, the processor may determine that the source device 104 is unresponsive based on the queue congestion state 157 and/or bandwidth utilization 158 as applied to overall external memory usage, per-pool external memory usage, and/or per-queue memory usage.

In step 510, the processor reduces a size of one or more queues 132 to prevent packets 102 transferring from the on-chip memory 130 to the external memory 140. And, in step 512, the processor reverts the reduced queues back to original size in response to detecting the packet rate for the queue is below a threshold. Thus, the network processor 100 may maintain the bad queue at a limited size until congestion on the bad queue is resolved. Thus, using method 500, the TMU 150 minimizes traffic or packets of the misbehaving source device 104 from being routed to external memory 140.

For example, the link between the network processor 100 and external memory 140 may be smaller than the line bandwidth of the network processor 100 (e.g., one-half or one-third the bandwidth) for various advantageous reasons. By artificially reducing the queue size of a bad queue from the size a queue typically is in order to perform active queue management, the external memory 140, which is a limited resource, is protected. That is, by limiting a bad queue to a small size, packets don't have an opportunity to be pushed to external memory 140 since packets get serviced quickly in the smaller queue. Even if the queue is not serviced, its limited size has corresponding limited impact on the on-chip memory 130. Furthermore, even if a bad queue no longer uses external memory 140 it can still source packets to line so that under-run is avoided.

By contrast, previous network processors maintain these queues at full size that store large amount of data in packets, and therefore have a high likelihood of packets being kicked out to external memory and wasting limited resources. Thus, the method 500 reconfigures the queue size from the size a queue typically is in order to perform active queue management to a limited small size so that packets don't have an opportunity to be pushed to external memory 140.

Figure 6:
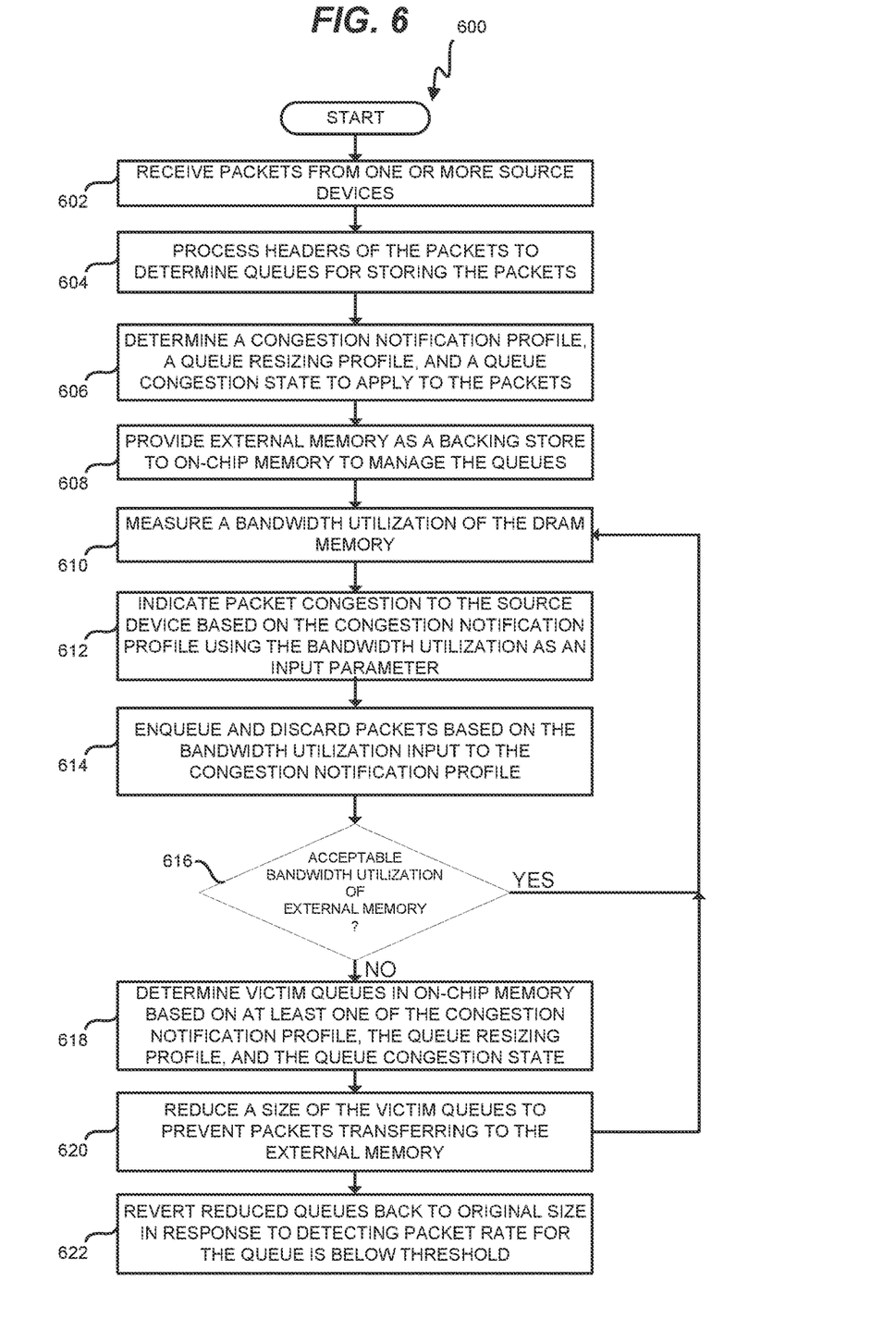
FIG. 6 is a flowchart illustrating a method of reducing traffic congestion in a network processor in yet another illustrative embodiment.

FIG. 6 is a flowchart illustrating a method 600 of reducing traffic congestion in a network processor in yet another illustrative embodiment. In particular, the method 600 relates to a combination of the bandwidth utilization technique and the bad queue reconfiguration technique for reducing congestion. The steps of method 600 are described with reference to the network processor 100 of FIG. 1, but those skilled in the art will appreciate that the method 600 may be performed in other systems.

In step 602, the input ports 112 of the network processor 100 receive packets 102 from one or more source devices 104. In step 604, one or more processor cores 160 process headers of the packets 102 to determine queues 132 for storing the packets 102. In step 606, a processor (e.g., thread 162 or TMU 150) determines one or more a congestion notification profile 155, a queue resizing profile 156, and a queue congestion state 157 to apply to the packets 102.

In step 608, external memory 140 (e.g., DRAM memory) is provided as a backing store to the on-chip memory 130 (e.g., on-chip SRAM memory) to manage the queues 132. In step 610, the bandwidth monitor 180 measures a bandwidth utilization of the external memory 140. In step 612, the processor indicates packet congestion to the source device based on the congestion notification profile 155 using the bandwidth utilization as an input parameter.

In step 614, the processor enqueues and discards packets based on the bandwidth utilization input to the congestion notification profile 155. In step 616, the processor determines whether the bandwidth utilization of the external memory 140 is acceptable. If so, the method 600 may return to repeat steps 610-616 as packets are received. Otherwise, the method 600 may proceed to step 618 and the processor determines victim queues in on-chip memory 130 based on at least one of the congestion notification profile 155, queue resizing profile 156, and queue congestion state 157.

In the process of discarding packets 102 using one or more bandwidth collapse prevention measures, the network processor 100 is configured to intelligently select victim traffic to drop so that the external memory 140 is not overloaded. Since the network processor 100 provides the ability for every queue 132 to be associated with a profile, profiles may be individually selected through the processor cores 160. In some embodiments, queue depth and various combinations of other congestion stats may also be applied as input to a profile.

In step 620, the processor reduces a size of the victim queues to prevent packets transferring to the external memory 140. And, in step 622, the processor may revert reduced queues back to their original size in response to detecting that the packet rate for the queue has fallen below a threshold. Accordingly, using method 600, external memory 140 is protected using a combination of bandwidth collapse prevention measures.

Figure 7:
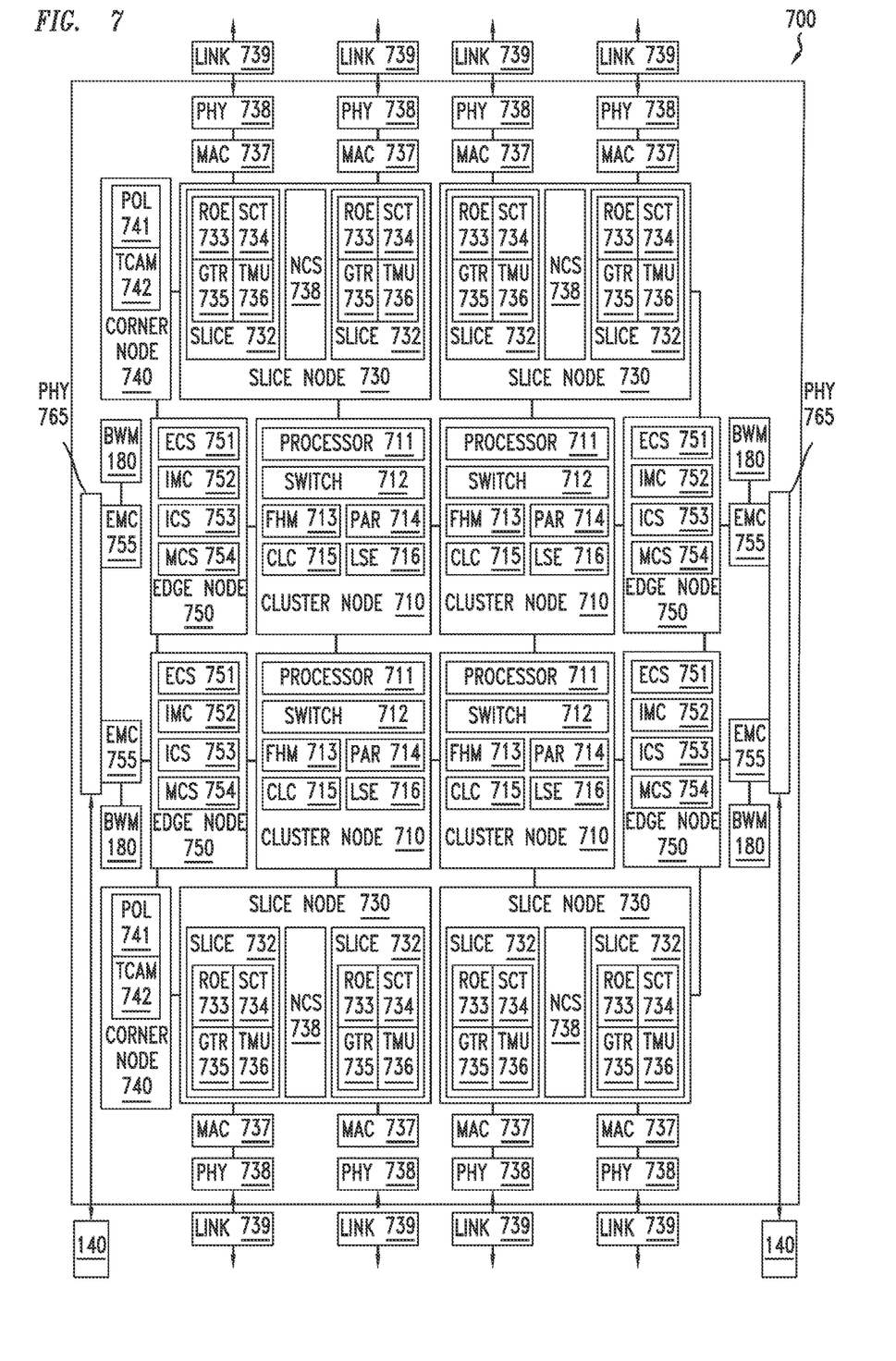
FIG. 7 is a block diagram of a network processor in another illustrative embodiment.

FIG. 7 is a block diagram of a network processor 700 in another illustrative embodiment. The network processor 700 includes cluster nodes 710, slice nodes 730, corner nodes 740, and edge nodes 750. Packets are processed at the cluster nodes 710, each of which includes a processor 711, a switch 712, a free header manager (FHM) 713, a parser (PAR) 714, a cluster local cache (CLC) 715, and a lookup and search engine (LSE) 716. Generally, smaller and frequently-accessed data structures reside in the cluster nodes 710 to ease the load on the on-chip network and shorten access latency. Each processor 711 may comprise a programmable core configured to simultaneously process multiple threads (e.g., sixty-four threads). Each thread may execute its own program and include its own program counter and dedicated local memory. The hardware accelerators of the cluster nodes 710 may be accessed by the threads at any point during processing.

The slice nodes 730 each include slices 732. Each slice 732 includes a reorder engine (ROE) 733, a scatter block (SCT) 734, a gather block (GTR) 735, and a traffic manager unit (TMU) 736. The Media Access Control (MAC) 737 transforms serial data received from the physical layer (PHY) 738 (e.g., SerDes phy) into a packet-based interface following various IEEE 802.3 Ethernet rates and Physical Coding Sublayer (PCS) implementations. This transformation may include alignment of PCS data lanes, bit error correction, decoding, packet delineation, and checking. In the opposite direction, the MAC 737 transforms packet data into serial data for the PHY 738 with steps opposite to the receive direction. The total throughput of the MAC 737 is dependent on the number and rate selection of attached PHYs 738. For example, each link 739 may implement 400 Gigabits per second (Gbps) throughput with four attached PHYs 738 running at a 100 Gbps rate.

The corner nodes 740 each includes a policer 741 and ternary content-addressable memory (TCAM) 742. The policer 741 implements hierarchical policing to enforce an overall rate that regulates traffic based on priority and weighted fairness. The TCAM 742 is a specialized type of high-speed memory capable of searching its entire contents in a single clock cycle.

A majority of on-chip memory may reside in the edge nodes 750. Each edge node 750 includes an external memory cluster switch (ECS) 751, one or more internal memory controllers (IMC) 752, an internal memory controller cluster switch (ICS) 753, and a memory cluster switch (MCS) 754. The ECS 751 provides backing storage on external memory 140 for data structures and packet data. The IMC 752 may implement embedded flat cache (e.g., on-chip memory 130) and provide high-bandwidth access to external memory 140 as the backing store. The IMC 752 may receive read, write, and Memory Operator (MemOp) request commands from the processor 711 and hardware assist blocks (e.g., SCT 734, GTR 735, LSE 716, and control plane) via the ICS 753. The IMC 752 also interfaces with an external memory controller (EMC) 755 via the ECS 751 which provides backing storage for data structures and packet data on the external memory 140 via phys 765.

For ease of illustration, the network processor 700 of FIG. 7 is shown as having four cluster nodes 710, four slice nodes 730, two corner nodes 740, and four edge nodes 750. However, it will be appreciated that the network processor 700 may include alternative numbers and configurations of components. Additionally, each slice 732 may include a plurality of instances of each block shown to provide, for example, a 400 Gbps bandwidth path. In one embodiment, the external memory 140 is implemented as a special type of dynamic random-access memory (DRAM) called high bandwidth memory (HBM) for off-chip storage of data. The single integrated circuit chip may be combined with multiple HBM devices on a single package.

Figure 8:
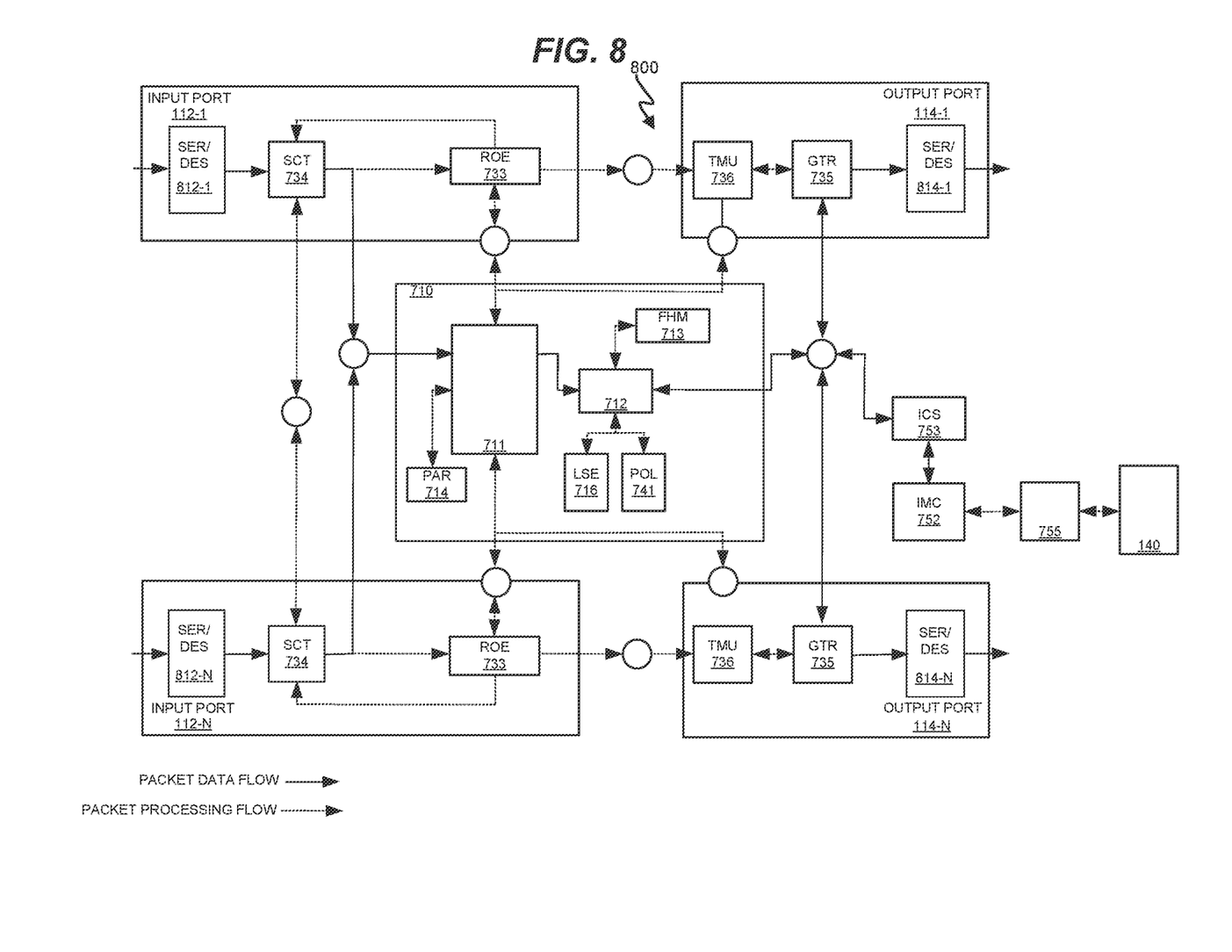
FIG. 8 is a flow diagram of a network processor in an illustrative embodiment.

FIG. 8 is a flow diagram of a network processor 800 in an illustrative embodiment. In FIG. 8, solid lines represent packet data flow, dotted lines represent packet processing flow, and circles represent the on-chip network. Packets arrive at input ports 112 which may include a receiver component of the MAC 737, or Serializer/Deserializer 812, that extracts the packets and sends it in chunks to the SCT 734. The SCT 734 sends a preconfigured amount of the packets to a local memory of the processor 711 sometimes referred to as scratchpad memory (SPAD). The SCT 734 may also assign a virtual packet ID which is conveyed to the ROE 733. The virtual packet ID is queued with the ROE 733 to allow out of order completion with multithreaded distributed processing while still maintaining in-order network behavior.

With the packet header received at the scratchpad memory, the assigned thread wakes up and starts to process the packet. While processing the packet, the thread may utilize various hardware accelerators including: PAR 714, LSE 716, policer 741, TCAM 742, and TMU 736. After the packet is processed, it is released to the TMU 736 via the ROE 733 to maintain in-order network behavior. The ROE 733 releases the packets to the TMU 736 associated with the output port 114 if networking order behavior is satisfied. The TMU 736, after receiving a packet, determines whether to queue the packet for transmission in the future or to immediately send it to the GTR 735 for transmission onto the line via a respective Serializer/Deserializer 814. Congestion may occur in situations in which traffic flow exceeds that of the TMU 736 of an associated port.

If the packet is queued, the packet fragment stored in scratchpad memory may be moved to a local memory of the TMU 736. Otherwise, the packet fragment may be copied to the local staging buffers within the GTR 735. As the GTR 735 receives the packet it collects the pieces of the packet from the scratchpad memory (if needed), internal memory (IMC 752), and external memory 140, and sends it to output port 114 or MAC 737 to place on the line.

Interaction with the TMU 736 in the packet flow may begin with packet admission requests from a processor 711 via the on-chip network. Packets may be pre-classified into a queue prior to entering the TMU 736. Then TMU 736 may determine whether packets can be sent for transmission by running through a queue-dependent congestion management algorithm and by checking that it has both enough memory bandwidth and buffer pool capacity to process the packet. For each packet the TMU 736 returns either an admission response or a drop with drop reason response to the processor 711.

If a packet is buffered, it is added to the appropriate queue and accounted for in the buffer pools associated with the packet. The TMU 736 may support a tiered buffer pool topology to track and limit memory usage amongst different traffic types. The TMU 736 may allocate and deallocate specific segments of memory for queue, create and delete queues, identify appropriate queues in which to store a newly received packet, and maintain a mapping of queues to packets stored in those queues. Additionally, the TMU 736 may update queue state as needed if a packet stored in that buffer is dropped or sent from the network processor 800, determine when packets should be dropped instead of storing the packet in a queue, and so forth.

Figure 9:
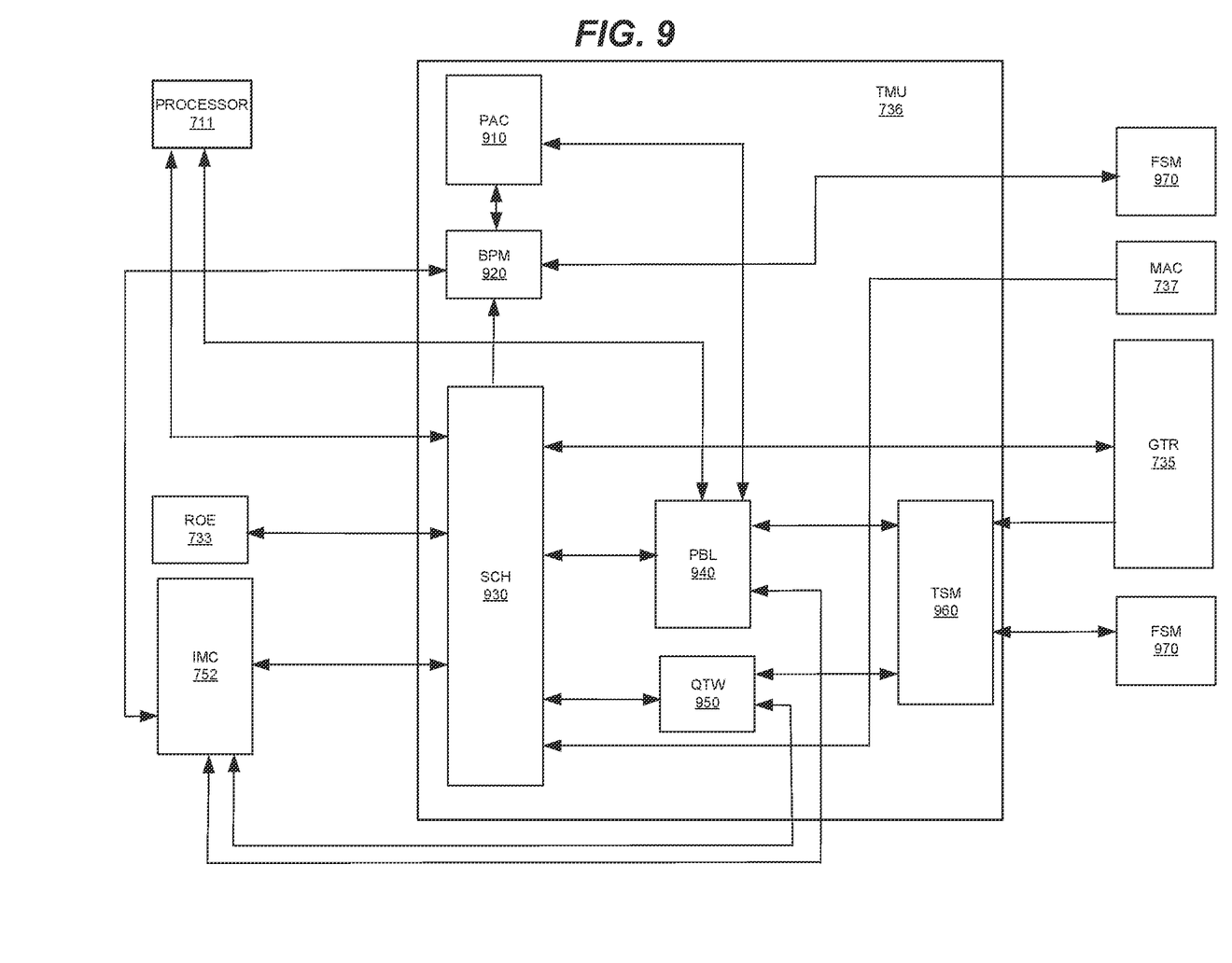
FIG. 9 is a diagram of the traffic manager unit in an illustrative embodiment.

FIG. 9 is a diagram of the TMU 736 in an illustrative embodiment. The TMU 736 includes packet admission control (PAC) 910, a buffer pool manager (BPM) 920, a scheduler (SCH) 930, packet buffer list (PBL) 940, queue timing wheel (QTM) 950, and a traffic segment manager (TSM) 960. As packet requests arrive from the ROE 733, they are processed by the SCH 930 one by one. The SCH 930 determines whether or not buffering is to occur for the request. If the request is to be buffered and it is also at the head of its queue, the scheduling logic also determines how long to buffer before transmitting. Packets not at the head of the queue are not scheduled for transmission until they are at the head of the queue.

It is possible for the system to become congested in scenarios in which incoming traffic has the same priority and the queues are oversubscribed. Under these conditions, queues may increase until they reach their maximum queue lengths which will, in turn, cause external memory utilization to become high and create a bottleneck at the external memory 140. In order to alleviate this situation, in response to detecting congestion (e.g., a queue hitting its maximum queue length), PAC 910 sets a bit for the queue to reduce its maximum queue length. If the queue falls below a threshold, the mode is cleared and the queue returns to normal operation.

The TSM 960 is configured to manage memory segments locally for the TMU 736 and the GTR 735. The TMU 736 obtains a segment when it decides to buffer a packet and notifies the processor 711 that it would like the packet header to be stored in the segment. The TMU 736 uses the segment to store both queue and packet data for buffering. The GTR 735 returns segments after it has finished working on the packet stored in the segments. The FSM 970 is configured to manage memory segments including tracking of available segments in on-chip memory 130 (e.g., IMC 752).

The PAC 910 determines whether or not to drop packets. The PAC 910 receives packet admission requests via any processor 711 and returns a response via the on-chip network. Additionally, PAC 910 obtains buffer pool utilization from the BPM 920. To access a queue buffering state, PAC 910 generates a request to the PBL 940. The PBL 940 stores packets that the SCH 930 decided to buffer. The QTM 950 tracks buffered requests (heads of queues) and determines whether the requests are ready for transmission. Given this context, buffering may refer to the time-keeping logic in the QTM 950 which determines when a request is eligible for transmit after being buffered, the physical queue control logic in the PBL 940 which tracks the status of physical queue components, and the on-chip memory 130 (e.g., IMC 752) which is used to store components for both the QTM 950 and the PBL 940.

Each QTM 950 maintains a list of queues to be transmitted after a delay associated with a spoke of the queue. This list may be as long as the number of queues supported by the TMU 736 (e.g., more than 32,000) if all the queues happen to belong to that spoke. To support such a large list, the QTM 950 may implement a linked list in the on-chip memory 130 (e.g., IMC 752). Each entry in the spoke may contain a pointer to the head and tail of this linked list. Queues are removed from the head of the list when the spoke's timer expires and new queues from the SCH 930 are added to the tail of the queue. The head and tail pointers may be implemented as a segment pointer. Thus, packets associated with a particular queue identifier may be stored in a linked list, and the linked list state may be maintained stored in the IMC 752. Accordingly, the TMU 736 may control queueing operation of packets with data structures physically residing in the IMC 752 and external memory 140. Each TMU 736 may implement a Level 1 or L1 cache, each IMC 752 may implement a Level 2 or L2 cache, and the external memory 140 may implement a Level 3 or L3 cache.

What is claimed is:

1. An apparatus, comprising:
on-chip memory configured to store packets in queues; and
a processor configured to, in response to determining that a source device is unresponsive to a congestion notification, reduce a size of one or more queues to prevent packets transferring from the on-chip memory to an external memory.

2. The apparatus of claim 1, wherein the processor is configured to:
send the congestion notification to the source device by applying a bandwidth utilization of the external memory as an input parameter to a Random Early Discard (RED) profile.

3. The apparatus of claim 2, wherein the processor is configured to:
determine that the source device is unresponsive to the congestion notification based on an increase in the bandwidth utilization of the external memory after sending the congestion notification.

4. The apparatus of claim 1, wherein the processor is configured to:
initiate sending the congestion notification to the source device based on a first threshold of the bandwidth utilization being exceeded; and
initiate selecting queues to reduce in size based on a second threshold of the bandwidth utilization, which is higher than the first threshold, being exceeded.

5. The apparatus of claim 1, wherein the processor is configured to:
reduce the size of the one or more queues in response to applying a Random Early Discard (RED) profile to preemptively select queues based on bandwidth utilization of the external memory.

6. The apparatus of claim 1, wherein the processor is configured to:

reduce the size of the one or more queues in response to detecting that the one or more queues have hit a maximum depth.

7. The apparatus of claim 1, wherein the congestion notification includes one of an explicit congestion notification and packet drop via Random Early Discard (RED).

8. A method, comprising:
storing, in on-chip memory, packets in queues; and
in response to determining that a source device is unresponsive to a congestion notification, reducing a size of one or more queues to prevent packets transferring from the on-chip memory to an external memory.

9. The method of claim 8, further comprising:
sending the congestion notification to the source device by applying a bandwidth utilization of the external memory as an input parameter to a Random Early Discard (RED) profile.

10. The method of claim 9, further comprising:
determining the source device is unresponsive to the congestion notification based on an increase in the bandwidth utilization of the external memory after sending the congestion notification.

11. The method of claim 8, further comprising:
initiating the congestion notification to the source device based on a first threshold of the bandwidth utilization being exceeded; and
initiating selecting queues to reduce in size based on a second threshold of the bandwidth utilization, which is higher than the first threshold, being exceeded.

12. The method of claim 8, further comprising:
reducing the size of the one or more queues in response to applying a Random Early Discard (RED) profile to preemptively select queues based on bandwidth utilization of the external memory.

13. The method of claim 8, further comprising:
reducing the size of the one or more queues in response to detecting that the one or more queues have hit a maximum depth.

14. A non-transitory computer readable medium including computer program instructions which, when executed by an apparatus, cause the apparatus at least to:
store, in on-chip memory, packets in queues; and
in response to determining that a source device is unresponsive to a congestion notification, reducing a size of one or more queues to prevent packets transferring from the on-chip memory to an external memory.

15. The non-transitory computer readable medium of claim wherein the computer program instructions, when executed by the apparatus, cause the apparatus at least to:
send the congestion notification to the source device by applying a bandwidth utilization of the external memory as an input parameter to a Random Early Discard (RED) profile.

16. The non-transitory computer readable medium of claim 15, wherein the computer program instructions, when executed by the apparatus, cause the apparatus at least to:
determine that the source device is unresponsive to the congestion notification based on an increase in the bandwidth utilization of the external memory after sending the congestion notification.

17. The non-transitory computer readable medium of claim wherein the computer program instructions, when executed by the apparatus, cause the apparatus at least to:
initiate the congestion notification to the source device based on a first threshold of the bandwidth utilization being exceeded; and
initiate selecting queues to reduce in size based on a second threshold of the bandwidth utilization, which is higher than the first threshold, being exceeded.

18. The non-transitory computer readable medium of claim wherein the computer program instructions, when executed by the apparatus, cause the apparatus at least to:
reduce the size of the one or more queues in response to applying a Random Early Discard (RED) profile to preemptively select queues based on bandwidth utilization of the external memory.

19. The non-transitory computer readable medium of claim 14, wherein the computer program instructions, when executed by the apparatus, cause the apparatus at least to:
reduce the size of the one or more queues in response to detecting that the one or more queues have hit a maximum depth.

20. The non-transitory computer readable medium of claim 14, wherein the congestion notification includes one of an explicit congestion notification and packet drop via Random Early Discard (RED).

21. An apparatus, comprising:
a first memory configured to store packets in queues; and
a processor configured to, in response to determining that a source device is unresponsive to a congestion notification, reduce a size of one or more queues to prevent packets transferring from the first memory to a second memory.

* * * * *